United States Patent [19]

Demopoulos et al.

[11] Patent Number: 4,654,145

[45] Date of Patent: Mar. 31, 1987

[54] DIRECT RECOVERY OF PRECIOUS METALS BY SOLVENT EXTRACTION AND SELECTIVE REMOVAL

[75] Inventors: George P. Demopoulos, Montreal, Canada; George Pouskouleli, Thessaloniki, Greece; Pierre J. A. Prud'Homme, Hull, Canada

[73] Assignee: Canadian Patents and Development Limited, Ottawa, Canada

[21] Appl. No.: 741,564

[22] Filed: Jun. 5, 1985

[30] Foreign Application Priority Data

Jun. 7, 1984 [CA] Canada .................................. 456044

[51] Int. Cl.⁴ .............................................. B01D 11/04
[52] U.S. Cl. .................................... 210/638; 210/727; 423/22; 423/24; 75/101 BE; 75/118 R
[58] Field of Search ...................... 210/634, 638, 727; 423/22, 24, 658.5; 75/118 R, 101 BE

[56] References Cited

U.S. PATENT DOCUMENTS

| | | | |
|---|---|---|---|
| 3,967,956 | 7/1976 | Payne | 423/22 |
| 4,041,126 | 8/1977 | Baltz et al. | 423/22 |
| 4,397,689 | 8/1983 | Lea et al. | 423/22 |
| 4,432,951 | 2/1984 | De Schepper et al. | 423/24 |
| 4,485,076 | 11/1984 | Bauer et al. | 75/101 BE |
| 4,500,494 | 2/1985 | Scher | 210/638 |
| 4,540,435 | 9/1985 | Miller et al. | 210/634 |

FOREIGN PATENT DOCUMENTS

| | | | |
|---|---|---|---|
| 1061574 | 9/1979 | Canada | 423/22 |
| 58-45125 | 3/1983 | Japan | 423/22 |

OTHER PUBLICATIONS

Demopoulos, George P. et al.; "A Study of the Hydrogenation of Kelex 100 Loaded with Copper"; *J. Chem. Tech. Biotechnol.*, 33A, 249–260 (1983).

Primary Examiner—Benoit Castel
Attorney, Agent, or Firm—Alan A. Thomson

[57] ABSTRACT

The direct recovery of precious metals, particularly gold and the platinum group metals, from chloride solutions, is achieved by solvent extraction and selective stripping/precipitation. Substituted quinolines are used as active extractant, in particular alkyl substituted 8-hydroxyquinoline. Gold is precipitated either by hot water, or by hydrogen after a cold water wash. Palladium remains in the organic phase and is precipitated by more severe hydrogen reduction or is stripped with acid. Platinum (and other precious metals) is stripped into water (the aqueous precipitant or wash), and can be recovered by hydrogen reduction (in stages). The organic phase is not degraded providing acid is washed out before any hydrogen reduction, and can be recycled.

15 Claims, 4 Drawing Figures

DIRECT RECOVERY OF PRECIOUS METALS BY SOLVENT EXTRACTION AND SELECTIVE REMOVAL

BACKGROUND AND PRIOR ART

Traditional precious metals (PM) refining processes involving a series of precipitation-dissolution steps are considered inefficient by today's standards in terms of the degree of separation achieved, the yields obtained and the complexity of the operation. Thus, a considerable amount of research and development work has been conducted in the last ten years or so with the purpose of developing solvent extraction (SX) based processes to overcome the problems related to traditional practice. Currently there are three such processes, one developed by INCO and operated at their Acton refinery in England, (Barnes, Edwards, 1982), one operated by Lonrho in South Africa (Edwards, 1979), and the third developed by Matthey Rustenburg Refiners (MRR) for which a plant was constructed in England (Reavill, Charlesworth, 1980). The three processes were compared and discussed recently by Flett (1982). The main advantages for the SX based processes are: (a) less lockup of valuable metal due to reduced overall processing time, (b) improved primary yields, (c) reduced process recycles, (d) flexibility and versatility, and (e) capability for increased process control.

The processes adopted by INCO and MRR and to some extent by Lonrho in their refineries are the selective extraction-separation of the various precious metals in successive stages using different extractants.

In current commercial refining processes, gold ($AuCl_4^-$) is extracted first from the primary precious metals with the use of solvating reagents such as dibutyl carbitol by INCO or methyl isobutyl ketone (MIBK) by MRR. After Au removal, anion exchanging reagents can be used for the co-extraction of Pt and Pd as practiced by Lonrho. However, selective stripping does not appear to be easily achievable (Cleare, Charlesworth, Bryson, 1979). Therefore, further chemical separation or use of another selective extractant is required for ultimate separation of Pd and Pt. Selective extraction of Pd is achieved with the use of neutral alkyl sulphides (INCO), or with the use of chelating agents such as hydroxyoximes (MRR). Both processes however are characterized by very slow kinetics. Platinum is finally recovered with anion exchange extractants such as tributyl phosphate (TBP) by INCO or amines (MRR).

Carbitols (trademark) are a group of mono and dialkyl ethers of diethylene glycol and their derivatives.

After extraction and stripping of each of the precious metals, salt precipitation, i.e., $Pd(NH_3)_2Cl_2$ and $(NH_4)_2PtCl_6$ followed by salt calcination are usually used to effect final metal recovery. Despite their advantages over the classical precipitation route the present solvent extraction processes have some unattractive features. These are: (a) long contact times (Pd, several hours), (b) need for interstage adjustments of feed composition, (c) use of different extractants and (d) multi-step recovery circuits.

Recently, comparative studies (Agarwal, Klumpar, 1979) on both routes, (a) selective extraction and (b) selective stripping for the separation of different base metals have concluded that the latter route appears to be economically more attractive than the former for base metals. We consider a selective stripping route might prove especially suitable for precious metals refining due to the complex solution chemistry involved.

Precious metals, in addition to their complex solution chemistry which enables us to apply solvent extraction processes for their separation, are also well known for their thermodynamic amenability to reduction to their metallic forms by the use of hydrogen gas (Findlay, 1983). It appeared to us that these two techniques, solvent extraction and hydrogen reduction, could be applied to the direct recovery of precious metals, and this is the basis of our invention.

In recent years the concept of the integration of solvent extraction and hydrogen reduction was introduced, and was applied for the production of some base metal powders (Burkin, 1973; Demopoulos, 1981). This operation, also called pressure hydrogen stripping, involves direct metal precipitation from the loaded organic phase using hydrogen in an autoclave. A modified version of this technique is the so called hydrolytic stripping (Thorsen, Monhemius, 1979) where instead of hydrogen, water at elevated temperatures is used. Very recently, the successful precipitation of Au with hydrogen from loaded Carbitol organic solvents was also reported (Li, Demopoulos, Distin, 1983).

Figure 1:
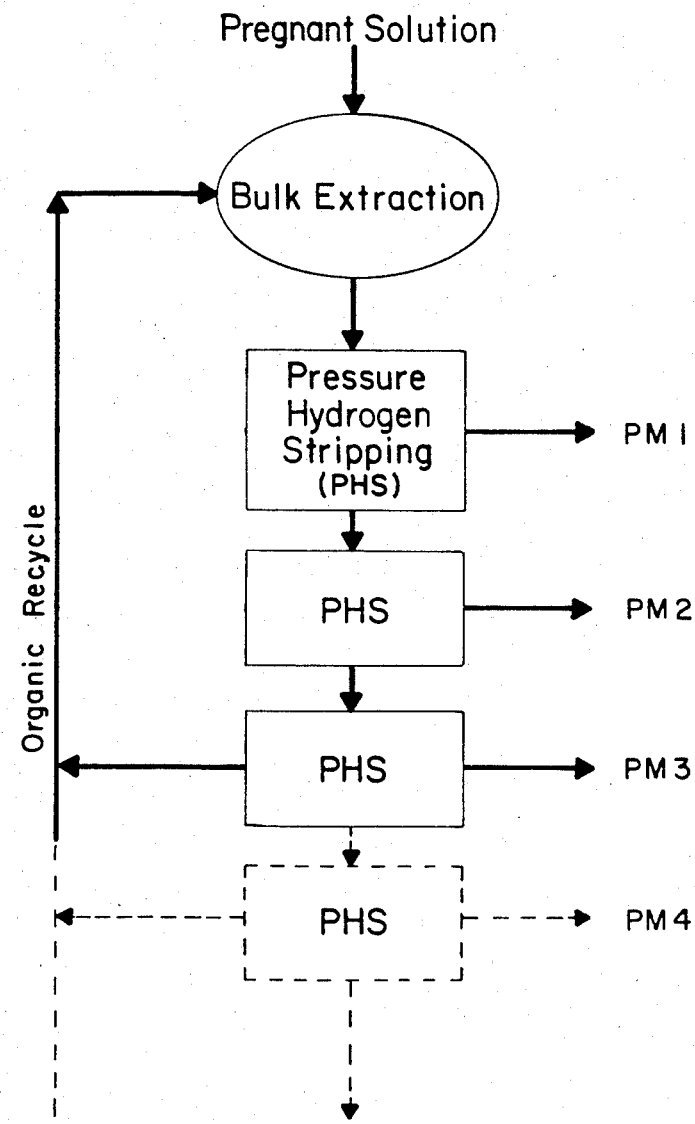
FIG. 1 is a general flowsheet of a bulk extraction-selective stripping process using sequential pressurized hydrogen stripping of precious metals.

The present research was initiated with the purpose of examining the possibility of direct recovery of various precious metals by the integration of solvent extraction (SX) and hydrogen reduction (HR). The conceptual SX-HR circuit for bulk extraction-selective stripping is illustrated in FIG. 1.

CHEMICAL CONSIDERATIONS

Chloride is the only effective medium in which Au and Pt group metals can be brought into solution. Thus, chlorine saturated HCl acid is used as the preferred leaching medium for precious metal concentrates. If solvent extraction is to be employed for the refining of the (PM) pregnant leach solutions then the nature of the chloro-complexes of the various precious metals is of great importance. The most common chloro-species of the Pt group metals are listed in Table 1 (Stern, 1981; Cleare, Charlesworth, Bryson, 1979).

TABLE 1

THE MOST COMMON CHLORO SPECIES OF THE PRECIOUS METALS

| Element | Oxidation State | Chloro Species |
| --- | --- | --- |
| Gold (Au) | III | $[AuCl_4]^-$ |
| Platinum (Pt) | II | $[PtCl_4]^{2-}$ |
|  | IV | $[PtCl_6]^{2-}$ |
| Palladium (Pd) | II | $[PdCl_4]^{2-}$ |
|  | (IV) |  |
| Iridium (Ir) | IV | $[IrCl_6]^{2-}$ |
|  | III | $[IrCl_6]^{3-}$ |

TABLE 1-continued
THE MOST COMMON CHLORO SPECIES OF THE PRECIOUS METALS

| Element | Oxidation State | Chloro Species |
|---|---|---|
| Rhodium (Rh) | III | $[RhCl_6]^{3-}$ |
| Ruthenium (Ru) | IV | $[RuCl_6]^{2-}$ |
|  | III | $[RuCl_6]^{3-}$ |
| Osmium (Os) | IV | $[OsCl_6]^{2-}$ |

It appeared to us that solvent extraction of these chloro-species could be effected either by an ion exchange mechanism or by direct bonding of the organic ligand to the metal ion itself. The latter mechanism depends on the ease of substitution of the chloride anion with the organic anion in question. We found that for Pt group metals this happens only in the case of Pd which is sufficiently labile. Ion exchange is the dominant mechanism. The charge and the size of the extracted species are the determining factors in this case.

Initial tests using Kelex ®100, an alkylated derivative of 8-hydroxyquinoline (Dempoulos, Kistin, 1983a), initially developed for the copper solvent extraction industry, are the basis of the present invention. This was possible because Kelex 100 is capable of acting both as a chelating agent and as an anion exchange agent when it is protonated. The simple protonated forms of Kelex 100 (KH) are shown below:

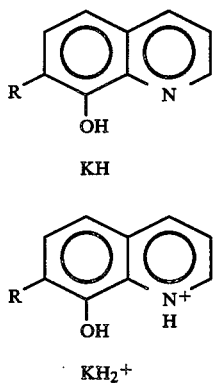

where R=alkyl ($C_{11}$ or $C_{12}$).

Apart from its unique extracting properties, Kelex 100 was found (Demopoulos, Distin, 1983b) to exhibit excellent chemical and thermal stability characteristics when it is treated under hydrogen reduction conditions, an important consideration for the present invention.

SUMMARY OF THE PRESENT INVENTION

This invention includes a method of separating and recovering gold from aqueous chloride solutions thereof, comprising:

(a) contacting the chloride solution with a solvent extractant phase including as active extractant, a substituted quinoline having at least a substituent in the 8-position selected from hydroxyl, sulfhydryl, a primary or secondary amine or sulfonamido, any substituent on the amino group being selected from alkyl having 1-8 carbon atoms, alkylsulfonyl and arylsulfonyl, until the gold is extracted into the organic phase, (b) precipitating the gold by one of (i) contacting the organic phase with water at a temperature warm enough to cause the gold to precipitate and (ii) washing the organic phase with cold water to remove extracted acid, followed by contacting with a gaseous phase comprising hydrogen until the gold precipitates, and (c) separating this precipitate and recovering the gold.

THIS INVENTION FURTHER INCLUDES

A method of extracting and separately recovering precious metals selected from gold and the platinum group metals, from aqueous chloride solutions thereof comprising (a) contacting the chloride solution with a solvent extractant phase including as active extractant, a substituted quinoline having at least a substituent in the 8-position selected from hydroxyl, sulfhydryl, and primary or secondary-amino or sulfonamido, any substituent on the amino group being selected from alkyl having 1-8 carbon atoms, alkylsulfonyl and arylsulfonyl, at temperatures up to about 80° C. until the precious metals are extracted into the organic phase, provided that when platinum is to be extracted the organic phase comprises an aromatic diluent;

(b) precipitating any gold in the organic phase from (a) by one of (i) contacting the organic phase with water at a temperature warm enough to cause the gold to precipitate, and (ii) washing the organic phase with cool enough water not to precipitate gold to remove extracted acid, followed by contacting with a gaseous phase comprising hydrogen until the gold precipitates, separating the gold precipitate, and providing that any platinum is in the aqueous phase and recovering the aqueous wash liquor or the aqueous precipitant;

(c) separating any palladium in the organic phase by one of (iii) precipitating with hydrogen and separating the palladium precipitate, and (iv) stripping with aqueous acid;

(d) precipitating any platinum and other precious metals in stages from the aqueous phase recovered from (b), and Pd from any aqueous acid from (c) (iv), and (e) recovering each of the precious metals precipitated.

Optionally when gold is present it initially may be extracted with a non-quinoline extractant which does not coextract others of the precious metals. Such non-quinoline extractants include the carbitol solvents and methyl isobutyl ketone.

A variety of substituted quinoline extractants may be used including those have the formula

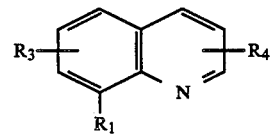

where
$R_1$=OH, SH or $NHR_2$
where
$R_2$=H, $C_1$-$C_8$ alkyl, alkylsulfonyl or arylsulfonyl,
$R_3$=$C_8$-$C_{17}$ alkyl,
and
$R_4$=H, $C_1$-$C_4$ alkyl, Cl or sulfonyl.

Preferably the quinoline extractant is an 8-hydroxyquinoline having in the 7-position an alkyl group of 8–13 carbon atoms.

The organic phase usually includes a diluent and a modifier having a hydroxyl group as known in solvent extraction art.

According to a preferred method, gold, platinum and palladium are present in the chloride feed solution, and in step (a) the chloride solution is bulk extracted with an 8-hydroxyquinoline in an aromatic diluent containing an isodecanol-type modifier, the quinoline being present in at least about 15 vol % of the organic phase, causing the gold, platinum and palladium to be co-extracted; in step (b) the loaded organic phase is subject to hydrolytic stripping at about 80° C. causing gold to be precipitated and platinum to be stripped into the aqueous phase; in step (c) subjecting the organic phase from (b) to hydrogen reduction at about 150° causing the palladium to precipitate; and in step (d) subjecting the aqueous phase from (b) to hydrogen reduction at about 60° C., causing the platinum to precipitate. Recent tests have indicated it is preferable to strip Pd from the organic with strong acid (e.g. 2N-8N HCl) and precipitate from the aqueous phase (e.g. with ammonia or by $H_2$ reduction).

The initial chloride solutions may contain a wide concentration range of chloride e.g. from about 4–200 or more g HCl/L.

The water temperature used during the gold precipitation usually will be within about 25° C.–120° C. For washing the organic phase to remove acid yet without causing any gold precipitation, the water temperature should be ambient, or below about 20° C. In the absence of gold, Pt most readily is stripped with water at about 50°0 C.–90° C. The following examples are illustrative. Two solvent compositions were used throughout these examples. The first one consisting of 5 v/o Kelex 100 and 10 v/o isodecanol as modifier dissolved in kerosene (aliphatic diluent) was mainly used in conjunction with the Au and Pd tests. The second one consisting of 15 v/o Kelex 100 and 15 v/o isodecanol dissolved in Solvesso ®150 (aromatic diluent) was primarily used for the Pt tests. Solvesso 150 (aromatic diluent) was primarily used for the Pt tests. Solvesso 150 was used in the latter case to increase the solubility of the Pt extracted species. A temperature of about 63° C. was preferable to avoid any precipitation problems during Pt extraction. Synthetic aqueous chloride feed solutions for Au(III) and Pd(II) were prepared by dissolving $NaAuCl_4.2H_2O$ and $PdCl_2$ respectively in HCl media, while Pt(IV) feed solutions were prepared by aqua regia dissolution of metallic Pt according to known procedures.

All extraction tests were performed in separatory funnels, using an aqueous to organic volume ratio of 1:1 except for the isotherm construction tests. Hydrogen reduction tests were conducted in a 1-liter Parr stainless steel autoclave. Ultra-high purity hydrogen and prepurified nitrogen gases were used during the hydrogen and hydrolytic stripping tests respectively. Metal values in organic and aqueous samples were analysed by atomic absorption spectrophotometry. The organics were first destroyed with $HClO_4$—$HNO_3$ mixtures.

EXAMPLE 1

Extraction Studies

Separate extraction tests were conducted with feed solutions of each of the precious metals (Au, Pt and Pd) to evaluate the extraction performance of Kelex 100.

Figure 2:
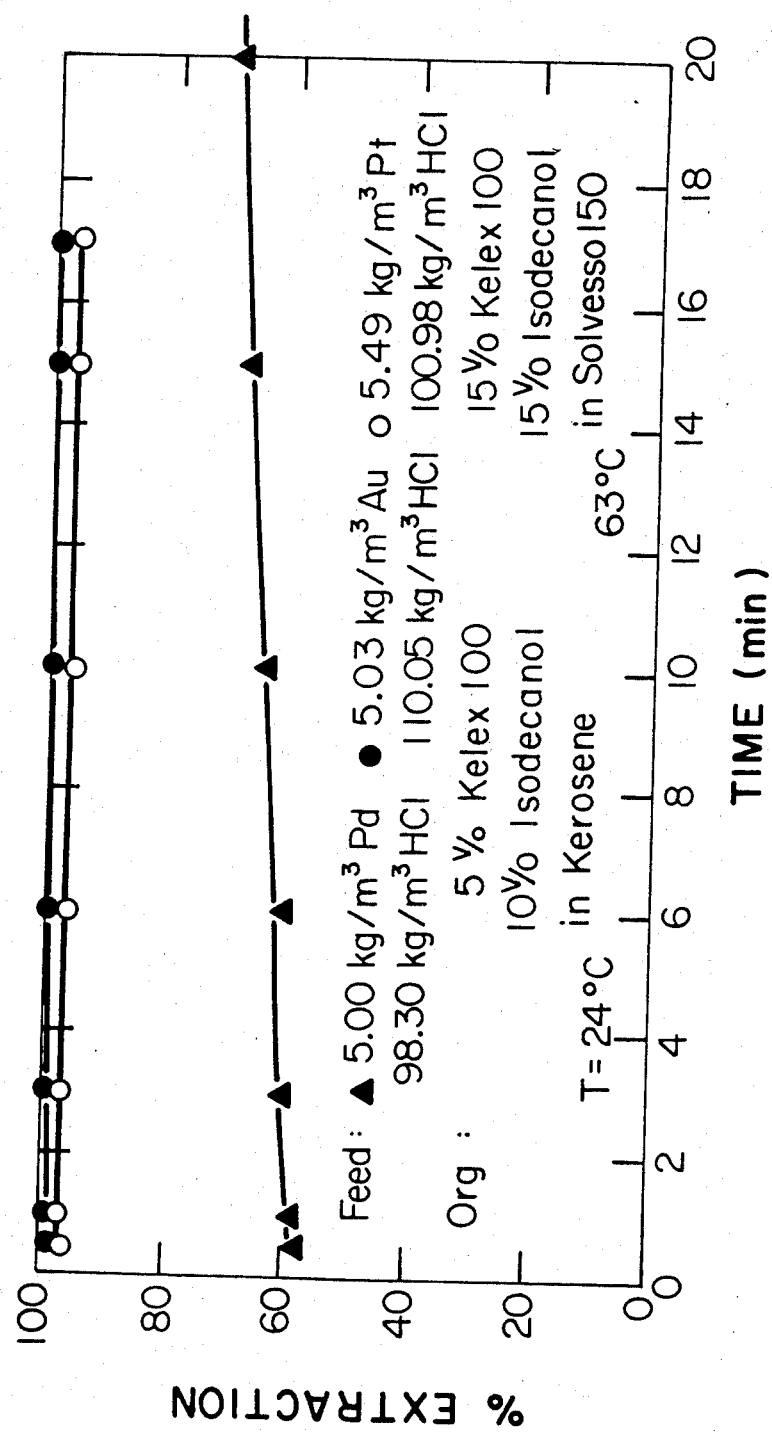
FIG. 2 is a graph showing the effect of contact time with extractant on % extraction of Au(III), Pd(II) and Pt(IV).

Kelex 100[1] was found to extract all three PM from their respective chloride solutions (~100 kg/m$^3$ HCl) at very fast rates (1 min)). The kinetic results obtained along with the conditions applied for each individual test are shown in FIG. 2. An aromatic diluent (Solvesso 150) and a higher temperature (63° C.) had to be employed in the case of Pt extraction to improve the solubility characteristics of Pt in the organic phase. The results of FIG. 2 clearly indicate the Pd can be extracted almost instantaneously when coextracted with Au and Pt by Kelex 100[1] while other solvent extraction schemes employing selective extraction suffer from very slow kinetics, e.g. oximes (Cleare, Charlesworth, Bryson, 1979); sulphide (Barnes, Edwards, 1982; Edwards, 1979). On the other hand the relatively lower extraction level for Pd (60% extraction) might indicate different extraction mechanisms between Pt and Pd. Two possible applicable mechanisms are expected in the present case; chelation and anion exchange. One factor which could help identify the type of mechanism prevailing for each PM is the effect that HCl has on the extraction.

Figure 3:
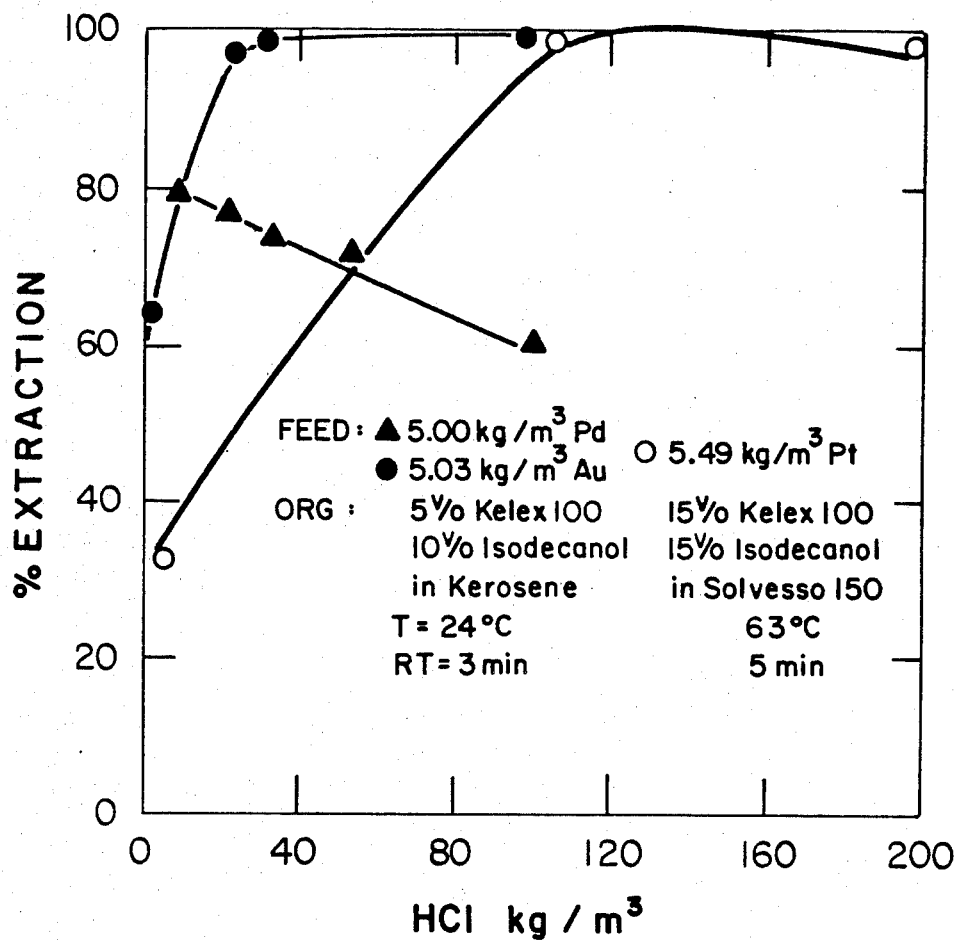
FIG. 3 is a graph showing the effect of HCl concentration on Au(III), Pd(II), and Pt(IV) extraction.

The results describing the effect HCl has on the extraction of Au, Pd, and Pt are summarized in FIG. 3. As can be seen, the extraction of Au and Pt is drastically increased with an increasing HCl concentration. At high acid concentrations Kelex 100[1] is protonated and therefore acts as an anionic exchanger for Au and Pt.

1. Registered trademark of Sherex Chemical Company.

With low HCl concentrations it appears that either the above mechanism is taking place or chelation or both. The color of the Au-loaded organic phase was found in fact to vary according to the original HCl concentration. Detailed spectroscopic studies are needed to elucidate the exact nature of the complex formed.

In contrast to Au and Pt, an increase in HCl concentration had an adverse effect on Pd extraction as it is seen in FIG. 3. This is believed to be due to Pd extraction via a chelate formation. To test this hypothesis the following experiment was performed. Kelex 100, acidified previously with a 10 v/o HCl solution (45 kg/m$^3$) HCl) was brought in contact with individual PM feed solution of low acidity (2.5 kg/m$^3$ HCl). Au and Pt extractions were markedly increased (from 31 and 34 to 96 and 80% respectively in comparison to non-acidified Kelex 100) while Pd extraction was only marginally affected. Thus, it can be tentatively concluded that Pd is extracted by chelate formation and not via anion exchange. Chelation has been also reported in the case of Pd extraction with hydroxyoximes (Cleare, Charlesworth, Bryson, 1979) but at a much slower rate.

By varying the phase ratio of the aqueous and organic phases the extraction isotherms for Au, Pd, and Pt were obtained. Due to limited supplies of Au and Pd, the extraction isotherms for these two metals were constructed using a 5 v/o Kelex solvent, while Pt tests were performed with 15 v/o Kelex 100.

No Adjustment of the equilibrium acid content was made since extraction was carried out at high acid levels (100 kg/m$^3$ HCl). From the isotherm it can be deduced that 5 v/o Kelex 100 has a loading capacity of 23.7 kg/m$^3$ Au when in contact with an aurochloride feed of 100 kg/m$^3$ Au when in contact with an aurochloride feed of 100 kg/m$^3$ HCl. This loading corresponds to a ratio of Kelex:Au =1.1 which is in accordance with the previously postulated anion exchange extraction mechanism. That is, Au is extracted as $KH_2^+.AuCl_4^-$ For the 15 v/o Kelex 100 solvent a loading capacity of 20.5 kg/m$^3$ was determined which corresponds to a ratio of Kelex:Pt=4. This metal exists as a double charged chlorocomplex PtCl$_6^{2-}$ and the ratio shows that apart from the two protonated Kelex 100 molecules required for ion-pair formation, two extra Kelex molecules are also used to solvate this ion-pair, producing a complex of the following composition [PtCl$_4^{2-}$.2KH$_2^+$.2KH]. Finally, a Pd loading capacity of approximately 4 kg/m$^3$ for 5 v/o Kelex 100 was obtained when the latter was in contact with a 100 kg/m$^3$ HCl solution. Kelex 100 involved in this loading was only 55% of the amount existing in this solution; the rest (45%) was found to be in protonated form under these acidic conditions.

Formulation of the organic solvent usually requires apart from the extractant the presence of a long chain alcohol or phenol as modifier. The diluent in the case of Pt should be aromatic in nature while Au and Pd are equally extracted with aliphatic (e.g. kerosene) or aromatic diluents (e.g. Solvesso 150). Thus in a co-extraction system, Solvesso 150 or equivalent should be used instead of kerosene to ensure good solubility and phase separation characteristics. Also an elevated temperature of about 60° C. is recommended for better extraction performance by Kelex 100 with respect to Pt. Fast phase disengagement times of 1 min for Au and Pt and 3 min for Pd were also recorded. If Pt concentrations are low, aliphatic diluents can be used.

For commercial operations high loading capacities are always desired. Preferably at least a 15 v/o Kelex 100 (0.4M) extractant in the presence of a modifier and an aromatic diluent is required if good co-extraction of Au, Pd and Pt is sought. The measured bulk loading capacity for this solvent formulation was determined to be: 49.3 kg/m$^3$ Au; 5.0 kg/m$^3$ Pt; 4.0 Kg/m$^3$ Pd when in contact with 100 kg/m$^3$ HCl.

The Kelex 100 concentration might be increased even up to 30 v/o or more to improved even further these load capacity levels. Alcohol or phenol-type modifiers usually are present in a 5–30 vol. % range.

EXAMPLE 2

Stripping Studies

It was the objective of these tests to recover the precious metals directly from the organic phase using hydrogen in an autoclave. However, direct transfer of the loaded organic solvent into the autoclave was not appropriate due to the presence of HCl (Kelex 100 protonation) in the organic phase. HCl in the organic phase is undesirable for two reasons: (a) to avoid corrosion attack to the autoclave walls and (b) to avoid degradation of the Kelex 100.

H$_2$O Washing/Stripping

Acid removal from the organic phase has been effected by H$_2$O washing. H$_2$O washing of the three separately prepared PM loaded organic solvents (Au, Pt and Pd) resulted in markedly different behaviour.

Palladium:

Essentially complete Acid removal from the Pd loaded Kelex 100 was accomplished practically with three water washing stages (O/A=1; 60° C.; 2 min). No palladium was stripped out of the organic during this operation.

Platinum:

Water proved to be not only good to remove acid but also an efficient stripping agent for Pt-loaded Kelex 100. Even at room temperature (24° C.) Pt could be stripped with H$_2$O. Improved stripping efficiency was obtained at higher temperature (64° C.). As can be seen in Table 2 almost 100% Pt stripping is achieved with three stages at 60° C. using H$_2$O as stripping agent.

TABLE 2

WATER STRIPPING RESULTS FOR Pt(IV)-LOADED KELEX 100

| Stage No. | % Stripping | |
|---|---|---|
| | 24° C. | 64° C. |
| 1 | 3.3 | 38.8 |
| 2 | 25.4 (28.7) | 50.1 (88.9) |
| 3 | 30.8 (59.5) | 11.0 (99.9) |
| 4 | 20.0 (79.4) | |
| 5 | 4.2 (83.7) | |

Organic solvent: 15 vol % Kelex 100, 15 vol % isodecanol, 70 vol % Solvesso 150, 11 kg/m$^3$ Pt.
Stripping conditions: A/O = 1; RT = 5 min.
Values in parentheses indicate cumulative stripping efficiencies.

Gold:

While cold H$_2$O (24° C.) extracted only HCl from Au-loaded Kelex 100 contact with hot H$_2$O (60° C.) produced instantaneous metallic Au precipitation. Almost complete Au precipitation (99%) was found to take place in 2 hours and 100° C. or 4 hours and 80° C. These tests were conducted in the same autoclave as used for the hydrogen reaction tests. Some of the product was found in a powder form and some plated on the immersed metal (stainless steel) parts of the autoclave. No plating took place on the glass liner walls. From a practical point, this reaction will be well suited to being carried out in a glass reaction kettle at about 80° C. thus avoiding the need for autoclave operation (100° C.), and the plating problems associated with metallic surfaces. The mechanism by which the Au reduction takes place is not as yet clear. It appears that temperature is only accelerating the reaction but is not alone responsible for the stripping. Reloading tests with the reduced organic solutions showed that Kelex 100 has been regenerated. Analyses of the reduced organics for Kelex 100 also indicated complete regeneration of the extractant.

The facility with which H$_2$O can strip the organic from Au and Pt while Pd is not affected is another manifestation of the different nature of the respective complexes. The two ion pairs AuCl$_4^-$.KH$_2^+$ and PtCl$_6^{2-}$.2KH$_2^+$.2K are easily destroyed by H$_2$O due to Kelex deprotonation while the Pd Kelex 100 chelate is not affected.

EXAMPLE 3

Hydrogen Reduction

Gold:

Gold precipitation by hydrogen reduction was found to be significantly faster than that via hydrolytic stripping as discussed above. The effect of temperature on reduction kinetics at a constant hydrogen pressure of 695 kPa (100 psi) was studied. Tests covered the range 25° to 100° C., starting in each case with 5 kg/m$^3$ Au solutions. Gold was found to precipitate even at 25° C. although not completely. It was not certain at the low temperature whether the precipitation was due to H$_2$ or hydrolytic reduction. However, above 80° C. very fast kinetics were obtained. Thus, at 80° C., about one hour was needed for essentially complete reduction, giving about 34 ppm Au in the stripped organic solution. Extension of the reduction time to two hours resulted in only 2 ppm Au left in solution.

As mentioned earlier, HCl should not be present in the organic phase to avoid corrosion and degradation problems during hydrogen reduction. Hydrochloric acid is not only transferred to the organic phase during loading but some more is also formed during the reduction reaction.

Thus, it is preferred that $H_2O$ is present during hydrogen reduction to minimize (dilution effect) the adverse effects that HCl has on equipment and Kelex stability. For example, hydrogen reduction tests at 100° C. and 695 kPa $H_2$ in absence of $H_2O$ resulted in substantial organic degradation. Thus $H_2O$ at a ratio A:O=1 was present in all the reduction tests reported here. (The acid can be washed out of the organic phase before recycling).

Lower hydrogen pressures (350 kPa) were found to result in longer reduction times while the addition of seed (Au particles) was not found to accelerate kinetics or eliminate problems of plating on metallic surfaces. The seeding results are inconclusive at present since the added seed particles were found to coagulate into lumps at the aqueous/organic interface. It is of interest to note that in the case of Au reduction from Carbitol solvents seeding effects were not found to be significant and no plating was observed (Li, Demopoulos, Distin, 1983).

Platinum:

Since acid removal prior to autoclaving was not possible (Pt was stripped simultaniously) no reduction tests directly from the organic phase were conducted in the case of Pt in order to avoid the corrosion and degradation problems mentioned above. Instead, a few experiments were conducted involving Pt precipitation from the aqueous strip solution. These tests confirmed previously reported results that Pt precipitates readily under moderate temperature and hydrogen pressure conditions (Findlay, 1983). Thus at 60° C., 695 kPa $H_2$ and only 15 minutes reduction time, Pt was found to precipitate completely (1 ppm left in solution) from a chloride strip solution containing 2.2 kg/m³ Pt and 0.2N HCl. Some plating on the immersed metallic parts was again observed but most of the metal was collected in the form of a black powder. The fact that precipitation takes place from the $H_2O$ strip solution leads us to believe that no major impurities are expected to contaminate the product when a metal feed solution originating from leaching of PM concentrates is used. A thorough study of the reaction mechanisms involved in hydrogen reduction of Pt from aqueous solutions can be found elsewhere (Findlay, 1983).

Palladium:

Pd-loaded Kelex 100 was subjected to hydrogen reduction after it had been thoroughly washed with $H_2O$ to remove HCl. The effect of temperature on precipitation kinetics at a constant hydrogen pressure of 2780 kPa (500 psi) was followed.

Tests covered the range 100° to 150° C., starting in each case with 4.5 kg/m³ Pd solutions. At 100° C. an induction period of more than one hour was observed before Pd started to precipitate. At 150° C. Pd precipitation was practically complete within one hour with only 30 ppm Pd left in solution. A decrease in hydrogen pressure from 2780 to 695 kPa was not found to significantly affect Pd precipitation. In contrast to Au and Pt, no plating was observed during Pd precipitation. Also, seeding with Pd was found to have effect on reduction kinetics. However use of lower initial dissolved Pd concentrations seemed to result in slower kinetics especially at 100° C. These results could be interpreted as indicative of homogeneous nucleation rather than heterogeneous which seems to be the case for Au and Pt. Reloading tests and measurements of the Kelex 100 concentration of the reduced organic showed the reagent to be regenerated, i.e., to have the same loading capacity, thus allowing for organic recycling. Comparison of the present results with those of Findlay, 1983 on Pd precipitation from aqueous solutions reveals that Pd reduction is much more difficult from organic solvents. Elevated temperatures are required in the organic (−100° C.) while precipitation from the aqueous phase takes place even at room temperature. This marked difference is believed to be due to the strong Pd-Kelex 100 ($PdK_2$) chelate complex. Similar behaviour has also been observed in the case of Cu(II) reduction (Demopoulos, 1981).

Powder Product Characteristics

Microscopic examination of the powder products using a scanning electron microscope (SEM) showed most of the particles to be very fine with some of them clustered together in aggregates. SEM pictures of Au particles produced (a) by hydrolytic stripping and (b) by hydrogen reduction, are seen to have different shapes indicative of two different growth mechanisms. Particle aggregation is more pronounced in the case of Au produced via hydrolytic stripping. SEM pictures of Pt (a) and Pd (b) products have shown that the Pd product appears to be of more uniform particle size than the Pt product.

Figure 4:
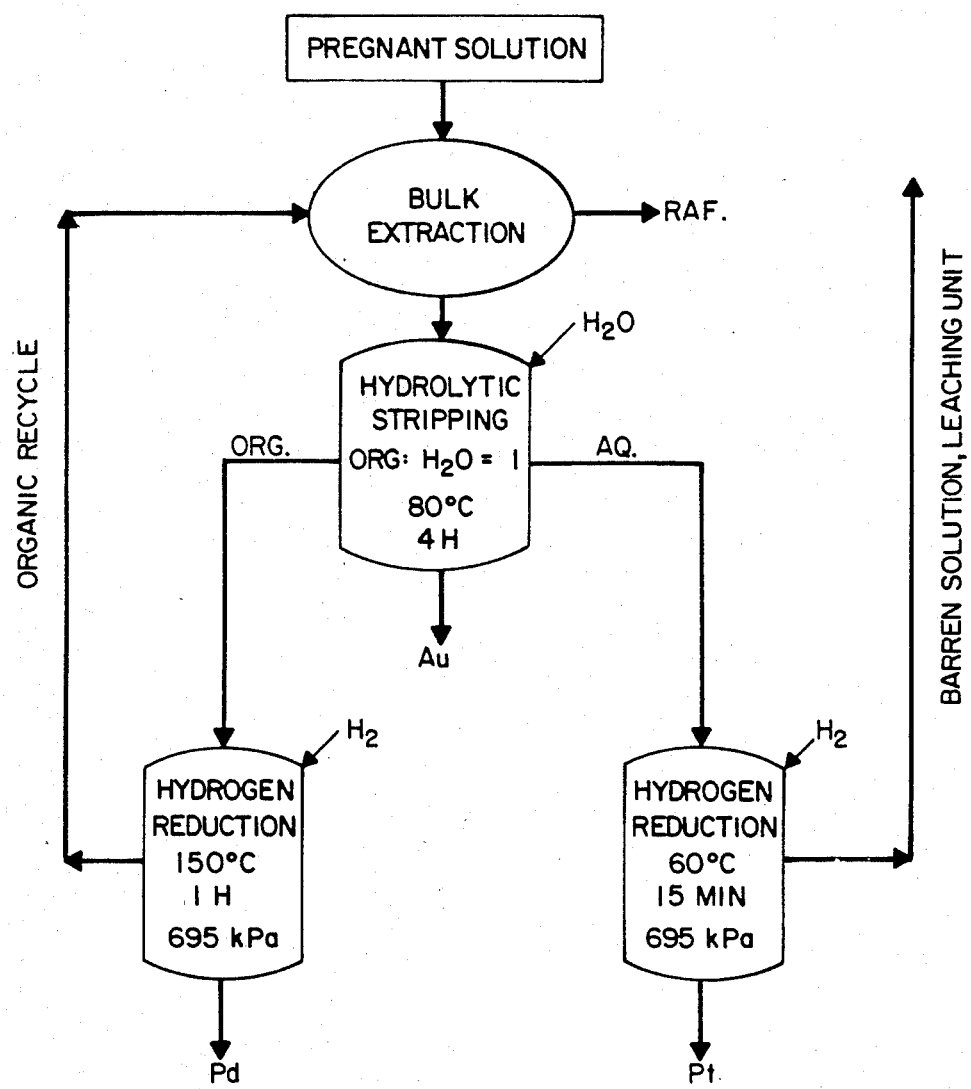
FIG. 4 is a flowsheet of a bulk extraction-selective precipitation of Au(III), Pt(IV) and Pd(II) using Kelex®100 extractant, in which RAF, represents the raffinate, ORG. represents the organic phase and AQ. represents the aqueous phase.

Based on the findings of the experimental work reported above the flowsheet of FIG. 4 is proposed to describe the integrated solvent extraction hydrogen reduction method for bulk extraction of Au-Pt-Pd followed by selective stripping. Preferably, the PM pregnant solution is brought in contact with the organic solvent containing at least 15 v/o Kelex 100, 15 v/o isodecanol diluted in Solvesso 150. Extraction is carried out at about 63° C. in order to obtain the best extraction rates.

The loaded organic phase is then transferred to a glass reaction kettle where it is subjected to hot $H_2O$ stripping (hydrolytic stripping) at 80° C. for 4 hours. At the end of this operation three phase separation (solid Au particles; aqueous strip rich in Pt and Pd loaded organic) is conducted similar to that practised by INCO in their Au-carbitol system. Recovery of Pt is accomplished by hydrogen reduction of the aqueous strip liquor in an autoclave, while Pd is recovered from the organic phase again by hydrogen reduction. The conditions applied are indicated in the flowsheet (FIG. 4). Alternatively Pt can be recovered by salt precipitation as known in the art. When iridium or other PM are present in aqueous strip or wash solutions, stagewise hydrogen reduction (increasing temperature and pressure) or stagewise salt precipitation may be used to effect their separate recovery.

In the case where Au is not present in the feed solution the hydrolytic stripping step can be replaced with a 3-stage $H_2O$ strip for Pt (63° C.) followed by the two hydrogen reduction steps for Pt and Pd recovery from the aqueous and organic phases respectively. If Pt is absent from the feed solution then the loaded organic can be treated with cold $H_2O$ ($\leq$20° C. for removal of HCl) with further hydrogen reduction for Au recovery (80° C. with 695 kPa $H_2$ for 2 hours) while Pd can be reduced as above. Instead of hydrogen stripping, Au can be recovered by hydrolytic stripping.

To increase the loading capacity of Kelex 100 with respect to Pt and Pd on the one hand and to overcome on the other hand the limitation of conducting three phase separation after the hydrolytic stripping of Au (FIG. 4), one may opt for the following alternative route. This is firstly to selectively extract Au using one of the known solvating extractants (e.g. Carbitol or MIBK) and after to use Kelex 100 for Pd-Pt coextraction and selective as described above. Amine type extractants are also known to coextract Pt and Pd but generally these extractants do not allow for selective stripping as has been reported elsewhere (Cleare, Charlesworth, Bryson, 1979).

Solvent extraction based refining processes for precious metals undoubtedly offer several advantages over the traditional precipitation process and their usage by the industry is expected to increase greatly. Thus a considerable amount of research and development has been conducted recently with the purpose of developing solvent extraction processes for separation and recovery of precious metals.

This invention has provided an alternative to the selective extraction separation route used in some refineries i.e. the alternative of bulk loading using Kelex 100 type extractants followed by selective direct recovery of precious metals by hydrogen reduction. Thus a less complicated refining flowsheet with apparent technical and economic gains results. As a preferred flowsheet, Kelex 100 (an alkylated derivative of 8-hydroxy quinoline) was found to give fast extraction kinetics for Au-(III) Pt(IV), and Pd(II) from chloride feed solutions. Gold can be recovered directly from the organic phase in a powder form either by hydrolytic stripping (contact with hot water e.g. 80° C.) or by hydrogen stripping in an autoclave. Platinum is stripped selectively with hot (pref. about 60° C.) water as stripping agent and recovered by hydrogen reduction of the aqueous directly from the organic phase by hydrogen reduction at 125°–150° C. or by strong acid stripping.

To avoid degradation of Kelex 100 during hydrogen reduction—a very important property since organic is to be recycled—coextracted HCl should not be present in the organic phase. Thus acid removal by $H_2O$ washing prior to hydrogen reduction should always be incorporated in a possible process flowsheet. Hydrogen reduction of the loaded organic in the presence of $H_2O$ was also found to enhance the chemical stability of Kelex 100.

Lix 26 (trademark) is another alkylated derivative of 8-hydroxyquinoline commercially available in the metals extraction industry from Henkel Corporation (it is believed to have a ring Cl substituent). Lix 26, similarly to Kelex 100, is capable of coextracting Au, Pt, and Pd selectively from chloride feed solutions containing a number of based metals as impurities. The most important advantage Lix 26 offers over Kelex 100 is in the extraction of platinum. Platinum is extracted with Kelex 100 at high efficiency at elevated temperatures (60° C.) while Lix 26 operates with high extraction efficiency for Pt at room temperature. Thus in the case of Lix 26 no precipitation problems in the organic phase are encountered and no need for heating the organic exists during extraction. Lix 34 (trademark) is similar to Kelex 100 and Lix 26 and may be used also but is less preferred (it is believed to have an 8-alkylsulfonamido substituent).

Specific examples demonstrating the superior performance of Lix 26 as a powerful extractant for precious metals from various feed solutions are described below. Based on these tests a preferred quinoline extractant has substituents $R_4$=Cl or sulfonyl in either or both rings of the quinoline.

EXAMPLE 4

Au Extraction—Effect of Contact Time

An organic phase consisting of 5 vol % Lix 26; 10 vol % isodecanol and 85 vol % Solvesso 150 was mixed at room temperature in a separatory funnel for various contact times at a ratio A/O=1 with an aqueous feed solution having the following composition: 5.56 g/l Au; 0.3 g/l Pd; 0.10 g/l Pt; 5.0 g/l Cu; 1.6 g/l $Fe^{3+}$; 0.013 g/l Pb; 100 g/l HCl. Analysis of the various aqueous raffinate solutions gave the results summarized in the following table 3.

TABLE 3

|  | Contact Time (min) | Au | Pd | Pt (ppm) | Cu | Fe | Pb |
|---|---|---|---|---|---|---|---|
| Aqueous Feed (AF) |  | 5556 | 313 | 100 | 5000 | 1600 | 13 |
| Aqueous Raffinate | 1 | 113 | 143 | 50 | 4940 | 1500 |  |
| Aqueous Raffinate | 3 | 21 | 120 | 15 | 4620 | 1310 |  |
| Aqueous Raffinate | 5 | 19 | 112 | 5 | 5070 | 1610 |  |
| Aqueous Raffinate | 10 | 13 | 101 | 5 | 5070 | 1650 |  |
| Aqueous Raffinate | 15 | 14 | 97 | 4 | 4930 |  |  |

As it can be seen gold extraction is almost instantaneous (1 min) and very selective towards base metals.

EXAMPLE 5

Au Extraction—Effect of A/O Ratio

An organic phase consisting of 10 vol % Lix 26, 10 vol % isodecanol and 80 vol % Solvesso 150 was mixed in a separatory funnel for 3 min at various A/O ratios with an aqueous feed solution having the following composition: 9.61 g/l Au; 0.47 g/l Pd; 0.20 g/l Pt; 4.73 g/l Cu; 1.01 g/l $Fe^{3+}$; 1.55 g/l Pb; 1.12 g/l Ni; 0.97 g/l Zn; 105 g/l HCl. Analysis of the various aqueous raffinate solutions gave the results summarized in the table 4.

TABLE 4

|  |  | Au | Pd | Pt | Cu (g/l) | $Fe^{3+}$ | Pb | Ni | Zn |
|---|---|---|---|---|---|---|---|---|---|
| A/O Ratio | Aqueous Feed (AF) | 9.61 | 0.47 | 0.20 | 4.73 | 1.01 | 1.55 | 1.12 | 0.97 |
| 10/1 | Aqueous Raffinate (AR) | 4.81 | 0.44 | 0.18 | 4.64 | 1.00 | 1.55 | 1.12 | 0.98 |
| 7/1 | AR | 2.94 | 0.44 | 0.19 | 4.74 | 1.00 | 1.49 | 1.11 | 0.97 |
| 5/1 | AR | 1.17 | 0.43 | 0.19 | 4.66 | 1.00 | 1.51 | 1.12 | 0.97 |
| 3/1 | AR | 0.10 | 0.40 | 0.13 | 4.64 | 1.01 | 1.47 | 1.13 | 0.91 |
| 1/1 | AR | 0.003 | 0.10 | 0.010 | 4.62 | 0.70 | 0.97 | 1.13 | 0.28 |

TABLE 4-continued

| | | Au | Pd | Pt | Cu (g/l) | $Fe^{3+}$ | Pb | Ni | Zn |
|---|---|---|---|---|---|---|---|---|---|
| 1/3 | AR | 0.001 | 0.001 | 0.008 | 4.01 | 0.32 | 0.39 | 1.13 | 0.05 |
| 1/5 | AR | 0.001 | 0.002 | 0.007 | 3.6 | 0.32 | 0.24 | 1.12 | 0.03 |

The results above indicate that Lix 26 has a very high loading capacity (~50 g/l Au/10 vol % Lix 26) and that best selectivity is achieved when the use of excess organic (i.e. A/O=½; 1/5) is avoided.

EXAMPLE 6

Pt-Pd Extraction

An organic phase consisting of 10 vol % Lix 26, 10 wt % isodecanol and 80 wt % Solvesso 150 was mixed at room temperature in a separatory funnel for 3 minutes at various A/O ratios with an aqueous feed solution having the following composition: 0.016 g/l Au; 5.74 g/l Pd; 3.08 g/l Pt; 9.53 g/l Cu; 0.33 g/l Te; 0.33 g/l $Fe^{3+}$; 0.27 g/l Pb; 0.95 g/l Zn; 0.39 g/l Bi; 0.42 g/l As and 100 g/l HCl. Analysis of the various aqueous raffinate solutions gave the results summarized in the following table 5.

TABLE 5

| | | (g/l) | | | | | | | | | |
|---|---|---|---|---|---|---|---|---|---|---|---|
| | | Au | Pd | Pt | Cu | $Fe^{3+}$ | Pb | Zn | Bi | As | Te |
| A/O Ratio | Aqueous Feed (AF) | 0.016 | 5.74 | 3.08 | 9.53 | 0.33 | 0.27 | 0.95 | 0.39 | 0.47 | 0.33 |
| 15/1 | Aqueous Raf (AR) | <0.012 | 5.31 | 2.54 | 9.54 | 0.34 | 0.26 | 1.03 | 0.38 | 0.44 | 0.33 |
| 10/1 | AR | <0.01 | 5.22 | 2.36 | | | | | | | 0.32 |
| 5/1 | AR | <0.01 | 4.8 | 1.81 | | | | | | | 0.31 |
| 3/1 | AR | <0.006 | 4.16 | 1.54 | | | | | | | 0.32 |
| 1/1 | AR | <0.006 | 1.60 | 0.59 | 9.26 | 0.26 | 0.17 | 0.41 | 0.06 | 0.47 | 0.35 |
| 1/3 | AR | <.006 | 0.12 | 0.047 | | | | | | | 0.35 |
| 1/5 | AR | <.006 | 0.031 | 0.024 | | | | | | | 0.34 |

The results above indicate that Pt and Pd can be selectively coextracted using a 10 vol % Lix 26 solvent at a loading capacity of over 12 g/l total metal (Pt + Pd) concentration.

EXAMPLE 7

Au-Pt-Pd Extraction

An organic phase consisting of 20 vol % Lix 26, 20 vol % isodecanol as modifier and 60 vol % Solvesso 150 as diluent was contacted at room temperature in a separatory funnel with an aqueous feed solution having the following composition: 5.68 g/l Au; 4.96 g/l Pd; 4.79 g/l Pt; 1.53 g/l Cu, 0.05 g/l Fe and 106 g/l HCl at a ratio A/O=1. After one (1) minute contact analysis of the aqueous raffinate phase gave the following results: <0.005 g/l Au; 0.34 g/l Pd; 0.048 g/l Pt; 1.45 g/l Cu; 0.05 g/l Fe and 89 g/l HCl. After five (5) minutes contact the raffinate analysis gave: <0.005 g/l Au; 0.30 g/l Pd; 0.046 g/l Pt; 1.47 g/l Cu; 0.05 g/l Fe and 89.5 g/l HCl. In other words the precious metals were extracted at very fast rates and high efficiencies: 99.9% Au extracted; 94% Pd extracted; 99% Pt extracted with no base metals extracted.

Recovery of the precious metals from the loaded organic solvents can be accomplished by a number of stripping techniques. Below examples of preferred techniques and conditions for the recovery of gold, platinum, and palladium are described.

EXAMPLE 8

Au Recovery

Gold was recovered in a powder form from the loaded organic solvent by contacting the latter with hot water (50°-100° C.). The contact was made in a standard glass reaction kettle under atmospheric conditions. To avoid undesirable oxidation of the organic phase nitrogen gas was blown continuously into the reaction kettle. Parameters affecting the rate of precipitation of gold are: contact time; organic to water ratio; temperature; Lix 26 concentration; Au concentration; seeding, and contactor type. Gold recovery data obtained under different precipitation conditions are given in the table 6. Scanning electron microscopy and electron microprobe analysis showed the gold powders to be very pure with only carbon appearing as an impurity (<1%). No base metals are present in the final product. The carbon content can be eliminated either by extensive chemical cleaning or by heating the gold product in an oxidizing atmosphere.

TABLE 6

| Precipitation conditions | | | | | | % Au precipitated (Recovered) |
|---|---|---|---|---|---|---|
| H₂O/Org (V/V) | Temp (°C.) | Lix 26 (vol %) | Au (g/l) | Seed (g/l) | CT (hrs) | |
| no H₂O | 80 | 5 | 5 | — | 2 | 73 |
| 1/1 | 80 | 5 | 5 | — | 2 | 74 |
| 1/10 | 80 | 5 | 5 | — | 2 | 91 |
| 1/10 | 80 | 5 | 5 | — | 4 | 97 |
| 1/10 | 90 | 5 | 5 | — | 2 | 93 |
| 1/10 | 70 | 5 | 5 | — | 2 | 73 |
| 1/10 | 80 | 5 | 5 | 3.3 | 4 | 94 |
| 1/10 | 80 | 1.5 | 5 | 0 | 4 | 73 |
| 1/10 | 80 | 1.5 | 5 | 3.3 | 4 | 87 |

EXAMPLE 9

Pt/Pd Separation and Recovery

Platinum and palladium coextracted into a Lix 26 organic solvent can be separated and recovered by two alternative stripping techniques: (i) Platinum stripping into an aqueous solution using water as stripping agent followed by palladium stripping into a separate aqueous solution using strong hydrochloric acid (2N to 8N) as stripping agent. (ii) Platinum stripping with water contact as in (i) followed by palladium powder precipitation with hydrogen gas under pressure. The Pd can be precipitated from the HCl solution with ammonium hydroxide, alkali metal hydroxide or by H₂ reduction. Stripping sequence (i):

An organic solvent consisting of 20 vol % Lix 26; 20 vol % isodecanol and 60 vol % Solvesso 150 preloaded with 3.97 g/l Pt and 4.60 g/l Pd was subjected to consecutive contacts first with water for platinum stripping and afterwards with HCl (8N) for palladium stripping. Contacts were made in separatory funnels at a ratio A/O=1 and mixing time=5 minutes. The obtained results are summarized in the tables 7 and 8.

TABLE 7

| Contact # | Pt stripping with $H_2O$ (cumulative %) | | |
|---|---|---|---|
| | 20° C. | 45° C. | 65° C. |
| 1 | 0.6 | 4.3 | 10.08 |
| 2 | 9.2 | 42.1 | 61.5 |
| 3 | 42.6 | 80.9 | 89.7 |
| 4 | 68.3 | 91.4 | 94.2 |
| 5 | 84.0 | 94.7 | |
| 6 | 90.5 | | |

TABLE 8

| Contact # | Pd stripping with HCl at 20° C. (cumulative %) | |
|---|---|---|
| | 6N HCl | 8N HCl |
| 1 | 14.0 | 41.0 |
| 2 | 28.5 | 74.0 |
| 3 | 41.1 | 92.5 |
| 4 | 51.5 | 97.7 |
| 5 | 59.8 | |
| 6 | 66.3 | |

Stripping sequence (ii):

Followed platinum stripping with water contacting as described above the loaded organic containing now only palladium can be treated with hydrogen in an autoclave for direct palladium recovery in a powder form. Parameters affecting palladium powder precipitation by hydrogen reduction are: temperature (60°-150° C.); hydrogen pressure (15-400 psi); seeding; Lix 26 concentration; Pd concentration, and retention time. With hydrogen reduction palladium precipitates quantitatively and the extractant is simultaneously regenerated thereby allowing for organic recycling. As an example 99% palladium precipitation occured when a 5 g/l palladium loaded organic consisting of 10 vol % Lix 26, 10 vol % isodecanol and 80 vol % Solvesso 150 was heated for 15 minutes at 125° C. and 200 psi pressure.

REFERENCES

Agarwal, J. C., and I. V. Klumpur (1979). The Role of Liquid Ion Exchange in the Processing of Complex Solutions, *J. Chem Tech. Biotechnol.*, 29, 730-740.

Barnes, J. E., and J. D. Edwards (1982). Solvent Extraction at INCO's Acton Precious Metal Refinery, *Chem. Ind*, 5, 151-155.

Burkin, A. R. (1970). Deposition of metal values. UK Pat. No. 1,215,574.

Cleare, M. M., P. Charlesworth, and D. J. Bryson (1979). Solvent Extraction in Platinum Group Metal Processing, *J. Chem. Tech. Biotechnol.*, 29, 210-224.

Demopoulos, G. P. (1981). Direct Copper Production from a Loaded Chelating Extractant by Pressure Hydrogen Stripping, Ph.D. Thesis, McGill University, Montreal, Quebec.

Demopoulos, G. P., and P. A. Distin (1983a). On the Structure and Composition of Kelex 100, *Hydrometallurgy*, 11, 389-396.

Demopoulos, G. P., and P. A. Distin (1983b). A Study of the Hydrogenation of Kelex 100 Loaded with Copper, *J. Chem. Tech. Biotechnol.*, 33A, 249-260.

Edwards, R. I. (1979). Selective Solvent Extraction for the Refining of Platinum Metals, *Proc. Int. Solv. Extr. Conf. ISEC 77*, 1, 24-31, CIM Special Volume 21.

Findlay, M. (1983). The Use of Hydrogen to Recover Precious Metals, In M. I. El Guindy (Ed.), *Proc. 6th International Precious Metals Institute Conference*, Pergamon Press, Toronto, Canada, p. 477-501.

Flett, D. S. (1982). Solvent Extraction in Hydrometallurgy, In K. Osseo-Asare and J. D. Miller (Eds), *Hydrometallurgy: Research, Development and Plant Practice*, The Met. Soc. of AIME, Warrendale, Pa, p. 39-64.

Freifelder, M. (1971). *Practical Catalytic Hydrogeneration: Techniques and Applications*, Wiley-Interscience, New York, p. 66.

Li, R. X., G. P. Demopoulos, and P. A. Distin (1983). Reduction of Gold from Dibutylcarbitol Using Hydrogen, paper presented at the 22nd Canadian Conference of Metallurgy, Edmonton, Alberta.

Reavill, L. R. P., and P. Charlesworth (1980). The Application of Solvent Extraction to Platinum Group metals Refining, *Proc. Int. Solv. Extr. Conf. ISEC 80*, 3, paper No. 80-93, Liège, Belgium.

Stern, D. W. (1981). Aqueous Chemistry of Precious Metals Applicable to Refining Processes, In G. Foo, M. E. Browning (Eds.), *Symposium on Recovery, Reclamation and Refining of Precious Metals*, San Diego, Cal.

Thorsen, G., and A. J. Monhemius (1979). Precipitation of Metal Oxides from Loaded Carboxylic Acid Extractants by Hydrolytic Stripping, paper presented at the 108th AIME Annual Meeting, New Orleans, La.

We claim:

1. A method of separating and recovering gold from aqueous chloride solutions thereof, comprising:
    (a) contacting the chloride solution with a solvent extractant phase including as active extractant, a substituted quinoline having at least a substituent in the 8-position selected from hydroxyl, sulfhydryl, and primary or secondary amine or sulfonamido, any substituent on the amino group being selected from alkyl having 1-8 carbon atoms, alkylsulfonyl and arylsulfonyl, until the gold is extracted into the organic phase,
    (b) precipitating the gold by one of
        (i) contacting the organic phase with water at a temperature warm enough to cause the gold to precipitate and
        (ii) washing the organic phase with cold water to remove extracted acid, followed by contacting with a gaseous phase comprising hydrogen until the gold precipitates, and
    (c) separating this precipitate and recovering the gold.

2. The method of claim 1 wherein said active extractant is an alkyl substituted 8-hydroxy quinoline.

3. A method of extracting and separately recovering precious metals selected from gold and the platinum group metals, from aqueous chloride solutions thereof comprising
    (a) contacting the chloride solution with a solvent extractant phase including as active extractant, a substituted quinoline having at least a substituent in the 8-position selected from hydroxyl, sulfhydryl, and primary or secondary-amino or sulfonamido, any substituent on the amino group being selected from alkyl having 1-8 carbon atoms, alkylsulfonyl and arylsulfonyl, at temperatures up to about 80° C. until the precious metals are extracted into the organic phase, provided that when platinum is to be extracted the organic phase comprises an aromatic diluent;

(b) precipitating any gold in the organic phase from (a) by one of
  (i) contacting the organic phase with water at a temperature warm enough to cause the gold to precipitate, and
  (ii) washing the organic phase with cool enough water not to precipitate gold to remove extracted acid, followed by contacting with a gaseous phase comprising hydrogen until the gold precipitates, separating the gold precipitate, and providing that any platinum is in the aqueous phase and recovering the aqueous wash liquor or the aqueous precipitant;

(c) separating any palladium in the organic phase by one of (iii) precipitating with hydrogen and separating the palladium precipitate and (iv) stripping with aqueous acid;

(d) precipitating any platinum and other precious metals in stages from the aqueous phase recovered from (b), and Pd from any aqueous acid from (c) (iv), and (e) recovering each of the precious metals precipitated.

4. The method of claim 3 wherein gold is present and is initially extracted with a non-quinoline extractant which does not coextract any other of said precious metals.

5. The method of claim 3 wherein said active extractant is an alkyl substituted 8-hydroxyquinoline.

6. The method of claim 3 wherein the quinoline extractant has the formula

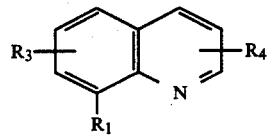

where $R_1$=OH, SH or $NHR_2$
where $R_2$=H, $C_1$-$C_8$ alkyl, alkylsulfonyl or arylsulfonyl, $R_3$=$C_8$-$C_{17}$alkyl,
and $R_4$=H, $C_1$-$C_4$ alkyl, Cl or sulfonyl.

7. The method of claim 6 wherein said extractant has $R_4$=Cl or sulfonyl in either or both rings of the quinoline.

8. The method of claim 6 wherein said extractant has $R_1$=alkylsulfonamido.

9. The method of claim 3 wherein the quinoline extractant is 8-hydroxyquinoline having in the 7-position an alkyl group of 8 to 13 carbon atoms.

10. The method of claim 3 wherein the solvent extractant phase includes a modifier having a hydroxyl group.

11. The method of claim 3 wherein gold, platinum and palladium are present in the chloride feed solution, and in step (a) the chloride solution is bulk extracted with an 8-hydroxyquinoline in an aromatic diluent containing an isodecanol-type modifier, the quinoline being present in at least about 15 vol % of the organic phase, causing the gold, platinum and palladium to be co-extracted; in step (b) the loaded organic phase is subject to hydrolytic stripping at about 80° C. causing gold to be precipitated and platinum to be stripped in the aqueous phase; in step (c) subjecting the organic phase from (b) to hydrogen reduction at about 150° C. causing the palladium to precipitate; and in step (d) subjecting the aqueous phase from (b) to hydrogen reduction at about 60° C., causing the platinum to precipitate.

12. The method of claim 3 wherein both Pt and Pd are co-extracted using an alkylsubstituted 8-hydroxyquinoline extractant and each stripped selectively from the organic phase.

13. The method of claim 12 wherein Pt is stripped first from the organic phase with water, followed by Pd stripping with strong acid solution.

14. The method of claim 12 wherein Pd is precipitated from its strip solution by hydrogen reduction.

15. The method of claim 13 wherein the strong acid is about 6N to 8N HCl.

* * * * *